US010956930B2

(12) United States Patent
Yuan et al.

(10) Patent No.: US 10,956,930 B2
(45) Date of Patent: Mar. 23, 2021

(54) DYNAMIC HIERARCHICAL EMPIRICAL BAYES AND DIGITAL CONTENT CONTROL

(71) Applicant: Adobe Inc., San Jose, CA (US)

(72) Inventors: Yuan Yuan, San Jose, CA (US);
Zhenyu Yan, Cupertino, CA (US);
Yiwen Sun, Santa Clara, CA (US);
Xiaojing Dong, Sunnyvale, CA (US);
Chen Dong, San Jose, CA (US);
Abhishek Pani, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 192 days.

(21) Appl. No.: 16/034,232

(22) Filed: Jul. 12, 2018

(65) Prior Publication Data
US 2020/0019984 A1 Jan. 16, 2020

(51) Int. Cl.
| G06Q 30/02 | (2012.01) |
| G06N 7/00 | (2006.01) |
| G06N 20/00 | (2019.01) |
| H04L 29/08 | (2006.01) |

(52) U.S. Cl.
CPC ......... *G06Q 30/0247* (2013.01); *G06N 7/005* (2013.01); *G06N 20/00* (2019.01); *H04L 67/22* (2013.01)

(58) Field of Classification Search
CPC .... G06Q 30/0247; G06N 20/00; G06N 7/005; H04L 67/22
See application file for complete search history.

(56) References Cited

U.S. PATENT DOCUMENTS

| 2005/0170528 A1* | 8/2005 | West ................... G06K 9/6282 436/518 |
| 2007/0185896 A1* | 8/2007 | Jagannath ............ G06K 9/6282 |
| 2007/0294768 A1* | 12/2007 | Moskovitch .......... G06F 21/566 726/24 |

(Continued)

OTHER PUBLICATIONS

Agarwal,"Estimating Rates of Rare Events at Multiple Resolutions", In Proceedings of the 13th ACM SIGKDD International Conference on Knowledge Discovery and Data Mining, Aug. 12, 2007, 10 pages.

(Continued)

*Primary Examiner* — Mario C. Iosif
(74) *Attorney, Agent, or Firm* — FIG. 1 Patents

(57) ABSTRACT

Dynamic Hierarchical Empirical Bayes techniques and systems are described that are implemented to control output of digital content. In one example, a system identifies splitting variables included in data. An amount of loss is then determined for each of the identified splitting variables by the system using a loss function. Based on the determined amounts of loss, the system selects at least one splitting variable from the plurality of splitting variables that are to be used to partition data in a respective node, e.g., a parent node to form a plurality of child nodes. The system, for instance, may select the splitting variable that minimizes the cost, i.e., has the lowest amount of cost. The selected splitting variable is then employed by the system to generate at least one hierarchical level of the hierarchical structure of the statistical model by partitioning data from the parent node into respective child nodes.

20 Claims, 8 Drawing Sheets

(56) References Cited

U.S. PATENT DOCUMENTS

2019/0318421 A1* 10/2019 Lyonnet .................. G06N 20/20

OTHER PUBLICATIONS

Agarwal,"Estimating Rates of Rare Events with Multiple Hierarchies through Scalable Log-linear Models", In Proceedings of the 16th ACM SIGKDD International Conference on Knowledge Discovery and Data Mining, Jul. 2010, pp. 213-222.

Casella,"An Introduction to Empirical Bayes Data Analysis", The American Statistician, vol. 39, No. 2, May 1985, 6 pages.

Lahaie,"Sponsored Search Auctions", Chapter 28, Algorithmic Game Theory, Cambridge University Press., 2007, pp. 699-716.

Lee,"Estimating conversion rate in display advertising from past performance data", In KDD, Aug. 12, 2012, 9 pages.

Menon,"Response Prediction Using Collaborative Filtering with Hierarchies and Side-information", In Proceedings of the 17th ACM SIGKDD International Conference on Knowledge Discovery and Data Mining., Aug. 24, 2011, pp. 141-149.

Sodomka,"A Predictive Model for Advertiser Value-Per-Click in Sponsored Search", In Proceedings of the 22nd International Conference on World Wide Web., May 13, 2013, 11 pages.

* cited by examiner

700

Algorithm 1: Dynamic Hierarchical Empirical Bayes
───────────────────────────────────────────────
Initialize a set of nodes to split $Q = \{root\}$
for *node p in Q* do
    get splitting variable $l^*$ and create child nodes $C = p_{l^*}$ acoording to (7)
    if *stopping criterion (10) is satisfied* then
        $C = \emptyset$
    else
        attach $C$ to $p$
    $Q = Q \backslash \{p\} \cup C$
for *leaf node ln in leaves* do
    for *bid unit bu in ln* do
        create child node $c$ for $bu$ and attach it to $ln$

*Fig. 7*

DYNAMIC HIERARCHICAL EMPIRICAL BAYES AND DIGITAL CONTENT CONTROL

BACKGROUND

The amount of data processed by "big data" digital analytical systems continues to increase, especially with the development of cloud computing. Analysis of this data by digital analytical systems is leveraged in a wide variety of ways to allocate computational and digital content resources, examples of which include recommendation engines and to control output of digital content as part of business decisions. One challenge confronted by these systems as part of resource allocations in the real world is that at a decision unit level, the data used as a basis to make the decision by the systems is sparse, despite the vast amount of data made available to the systems as a whole.

One technique used to address this challenge in data sparsity leverages the rest of the information in the big data, which is referred to as Hierarchical Bayes (HB). In Hierarchical Bayes, a statistical model includes multiple levels that form a hierarchical structure that is used to estimate parameters of a posterior distribution using a Bayesian method. Bayes theorem is used to integrate sub-models to form the hierarchical structure and account for uncertainty. The hierarchical structure of the statistical model is then used to update a probability estimate as additional evidence on a prior distribution is received in order to form a prediction based on past observances.

Hierarchical Bayes is implemented to statistically borrow information with a shrinkage-based estimation at an individual decision unit level. However, there are still challenges confronted by digital analytical systems when applying a Hierarchical Bayes model. First, a hierarchy structure must be determined by the system in advance in order to apply the model. This is especially challenging when the data does not possess a clear hierarchical relationship as typically encountered in real world scenarios.

Second, in practice, practitioners are limited to use two or three levels for HB models. The reason is that for full Bayesian analysis, simulation-based approaches are required in conventional techniques to obtain a joint posterior distribution. If there are too many levels, however, the model may become computationally expensive and sensitive to distribution assumptions and priors when applied to real-world data by the systems in order to converge. This limits accuracy and involves significant amounts of computational resources by conventional digital analytics systems and thus limits operation of these systems in these real-world scenarios.

SUMMARY

Dynamic Hierarchical Empirical Bayes techniques and systems are described that are implemented to control output of digital content. These techniques overcome the challenges and inaccuracies of conventional techniques and systems by generating a hierarchical structure automatically and without user intervention by a system based on the data, itself. In one example, data is received by the system. In a digital marketing content example, the data describes historical daily click and revenue as well as decision units and hierarchical features. From this data, the system generates a hierarchical structure of a statistical model from the data. The hierarchical structure, for instance, may include one or more intermediate hierarchical levels between a root node and a decision unit level.

To do so, the system first identifies splitting variables included in a first set of data. A wide variety of variables may be included in the first set of data, such as geographical location, keywords, age, gender, and so forth. An amount of loss is then determined for each of the identified splitting variables by the system using a loss function. A loss function is a function that maps an event or values of the splitting variables onto a result number as representing a "cost" associated with the event, e.g., in relation to one or more performance metrics. One such a performance metric is "revenue per click" (RPC).

Based on the determined amounts of loss, the system selects at least one splitting variable from the plurality of splitting variables that are to be used to partition data in a respective node, e.g., a parent node to form a plurality of child nodes. The system, for instance, may select the splitting variable that minimizes the cost, i.e., has the lowest amount of cost. The selected splitting variable is employed by the system to generate at least one hierarchical level of the hierarchical structure of the statistical model by partitioning data from the parent node into respective child nodes.

The statistical model, once generated, is then used by the system to control output of digital content based on a second set of data, e.g., for a particular user. To do so, the statistical model is applied to the second set of data to make a prediction regarding a performance metric, e.g., to make RPC predictions. The prediction is then used to select digital content that is likely to exhibit the greatest amount of performance, e.g., RPC for a particular item of digital content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 7 depicts an example algorithm usable to generate a hierarchical structure of a statistical model.

DETAILED DESCRIPTION

Overview

Figure 1:
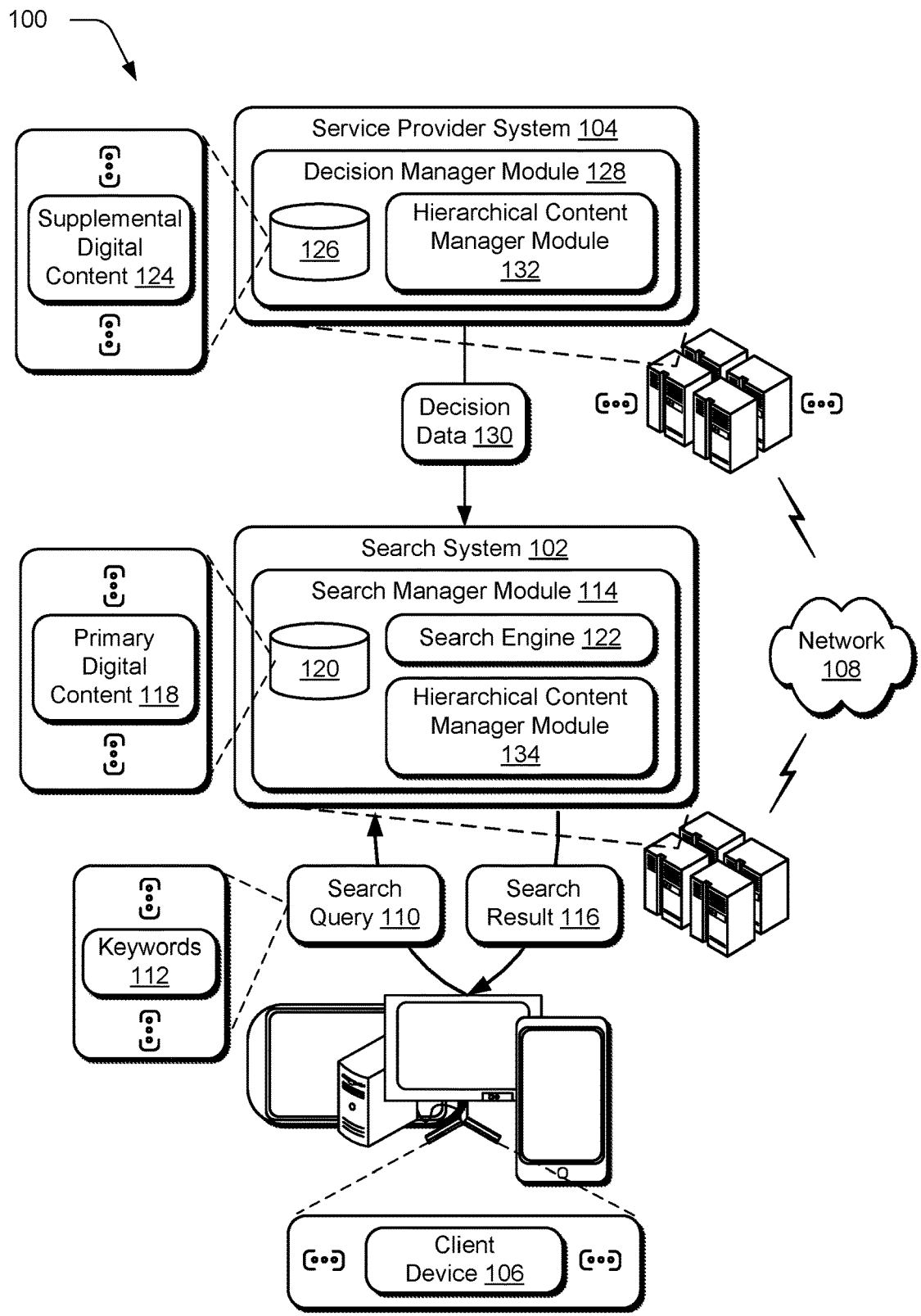
FIG. 1 is an illustration of an environment in an example implementation that is operable to employ dynamic hierarchical empirical Bayes techniques described herein.

One of the numerous challenges confronted by a conventional digital analytics system is that even though the amount of data available to the system as a whole may be vast, an amount of data available at an individual decision unit level that is to be used as a basis to make the decision is sparse. Therefore, approaches have been developed in which data is "borrowed" by the system to overcome the scarcity at the decision level, an example of which is referred to as Hierarchical Bayes (HB).

However, there are still challenges confronted by digital analytical systems when applying a conventional HB model. In one such example, this involves a requirement that a structure of the hierarchy of the model is determined in advance. This is especially problematic when the data does not possess a clear hierarchical relationship. The hierarchical structure, for instance, may begin with a root node that contains an entirety of a data set and progress through a series of layers to further refine the dataset to arrive at a "decision level" that is used as a basis to select digital content for output to a user, e.g., digital marketing content such as advertisements. Thus, the hierarchical structure specifies a sequence of decisions through parent and child nodes to arrive at a final decision level in the structure, which in this case is used to control output of digital content.

In conventional techniques, the hierarchical structure is determined manually by a user, which may be prone to error. It may not be intuitive to a user, for instance, to judge which features should be assigned to a parent node and which features should be assigned to a respective child node, e.g., between the features "keyword" and "geographic location." This challenge is further exacerbated by the multitude of characteristics that may be described in the data, e.g., from characteristics of the users to characteristics of the digital content itself. Therefore, conventional determinations made to control digital content output by a hierarchical structure are formed using a series of "best guesses" manually by a user that may be prone to error and are computationally expensive.

Accordingly, digital analytics system techniques are described in which a hierarchical structure of an HB model is determined empirically from the data itself. In this way, the techniques described herein may overcome the challenges of conventional techniques that involved a "best guess" on the part of a user to form the hierarchical structure. The hierarchical structure of the statistical model follows a tree structure (i.e., a tree model), in which, a tree grows dynamically by specifying a purity (i.e., loss) of a node and choosing a best split to form child nodes based on this loss. In the following, this is referred to as a Dynamic Hierarchical Empirical Bayesian (DHEB) technique. In this technique, a hierarchical structure of the statistical model is generated automatically and without user intervention by the digital analytics system using a loss function. Each sub region in a layer of the hierarchy is referred to in the following as a node.

Data, for instance, may include a multitude of variables used to describe user interaction with the digital content, e.g., the users, the digital content itself, and/or whether or not digital marketing content resulted in conversion. The system is configured to determine for each level of the hierarchy which variable and associated characteristics is to be used to split a node into one or more child nodes, which is referred to as a splitting variable. Accordingly, for each variable, the digital analytics system evaluates a corresponding loss with respect to a performance metric, and from this, determines which variable achieves a minimum amount of loss empirically from the data itself, which is then used as a basis to form child nodes in the hierarchy. The variable that exhibits the minimum amount of loss is selected as a splitting variable for that level in the hierarchical structure of the statistical model and used to form the child nodes. This process may continue by the system automatically and without user intervention to form layers of the hierarchical structure of the statistical model. In this way, the techniques described herein may optimize a hierarchical structure to make predictions of future actions, e.g., whether or not conversion will occur, based on knowledge learned from the data and not reliance on manual guesses by a user.

This technique may also incorporate a regularization term as part of the loss function that incorporates a Bayesian concept of a "prior." This supports a technique to merge the loss function into a HB framework such that estimates derived by the HB model are consistent with the optimal solutions for the loss function. In this way, optimal solutions to such a regularized loss function have a similar structure as the posterior estimates in an HB model by combining the prior (from the parent node) and the unit level data (from the child node). Thus, the techniques described herein achieve advantages of both a Hierarchical Bayesian model that supports borrowing of information from similar branches of a tree as well as use of a tree model to define the hierarchical structure using data. Further discussion of these and other examples is included in the following and shown in corresponding figures.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital content control techniques described herein. The techniques described herein may be utilized to control output of digital content in a variety of different scenarios as part of allocating the digital content as a resource. Thus, these techniques may be used to control computational as well as financial resources of an entity. Examples include decision making techniques implemented at a decision unit level, which may have sparse data, even though an amount of data overall that is usable by the system overall may be immense, i.e., "big data" involving Petabytes of data.

The illustrated environment 100 includes once such example of a "sponsored search" digital medium environment that includes a search system 102, a plurality of service provider systems (an example of which is illustrated as service provider system 104), and a plurality of client devices (an example of which is illustrated as client device 106). These devices are communicatively coupled, one to another, via a network 108 and may be implemented by a computing device that may assume a wide variety of configurations.

A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as shown for the search system 102 and the service provider system 104 and as further described in FIG. 8.

In one example of control of digital content output, a sponsored search is employed which begins with user interaction with the client device 106 to generate a search query 110 having one or more keywords 112. The search query 110 is communicated by the client device 106 via the network 108 to a search manager module 114 of the search system 102. The search manager module 114 is configured to generate a search result 116 based on the search query 110.

The search query 110 may be generated in a variety of ways. In the sponsored search example, the search result 116 includes primary digital content 118 (illustrated as stored in a storage device 120), such as organic search results generated by a search engine 122 of the search manager module 114 as part of a keyword search. The search result 116 may also include supplemental digital content 124 as part of "sponsoring" the search, which is illustrated as stored in a storage device 126. Output of the supplemental digital content 124 to the search system 102 by the service provider system 104 is controlled by a decision manager module 128.

Supplemental digital content 124 may take a variety of forms, examples of which include digital marketing content (i.e., advertisements), recommendations, items of digital content itself (e.g., digital movies, digital audio, digital media) and so forth. Digital marketing content refers to digital content provided to users related to marketing activities performed, such as to increase awareness of and conversion of products or services made available by a service provider, e.g., via a website. Accordingly, digital marketing content may also take a variety of forms, such as emails, advertisements included in webpages, webpages themselves, banner ads, and so forth.

In this example, the search result 116 includes the supplemental digital content 124 as digital marketing content configured as advertisements in a clearly marked section next to organic search results of the primary digital content 118. This process is managed by the search system 102 and the service provider system 104 through use of an auction-based keyword advertising by the search system 102 to the service provider systems 102. In this example, the service provider system 104 is a digital marketing system, e.g., an "advertiser." The decision manager module 128 of the service provider system 104 is used to generate decision data 130 that is used as a basis by the advertiser to specify criteria that are used to control output of the supplemental digital content 124, i.e., the digital marketing content. The decision data 130, for instance, may include a list of keywords, corresponding bids (e.g., monetary amounts) and corresponding supplemental digital content 124 for output.

Accordingly, when a user of the client device 106 generates a search query 110 having a certain keyword 112, the search engine 122 runs a real-time auction. As part of the real-time auction, the search engine 122 ranks the bidders (i.e., the service provider systems 104) based on corresponding keywords to decide which item or items of supplemental digital content 124 (e.g., "ads") is to be shown, and where it is to be shown within the search result 116. Revenue may be collected by the search system 102 from the service provider system 104 in a variety of ways. In one example, winning ads are charged by the "user clicks" instead of number of impressions. This means in this example that advertisers pay, solely, if their ads are selected (e.g., "clicked") by users of the client devices 106. Accordingly, in this example the search engine 122 is configured to determine which items of supplemental digital content 124 are to be included with the primary digital content 118 as part of the search result 116, e.g., through a ranking of the supplemental digital content 124.

Thus, this system implements a two-part technique involving the search system 102 and the service provider system 104. The service provider system 104 generates decision data 130 indicating parameters having monetary amounts associated with respective keywords 112 to "bid" on which items of supplemental digital content 124 are to be output. The search system 102 then controls output of which items of supplemental digital content 124 from which service provider system 104 are to be output based on decision data 130 received from respective service provider systems 104.

Accordingly, the service provider system 104 implements techniques to learn which keywords 112 exhibit greater value using performance metrics, examples of which include number of impressions, number of clicks, number of conversions, revenue per click (RPC), cost per click (CPC), and so on. This permits the service provider system 104 to manage decision data 130 (e.g., "bids") efficiently and allocate resource budgets accordingly. Revenue in the following may be defined by goals of the service provider system 104, which can be a monetary amount, number of orders, number of subscriptions and so on.

In this way, the search engine 122 provides a platform for the service provider system 104 to manage the decision data 130 as "bids" and apply targeting and budgeting decisions. This decision data 130 is then used to control which items of the supplement digital content 124 are provided by the search system 102 to users of the client devices 106. To do so, the decision manager module 128 and the search manager module 114 include respective hierarchical content manager modules 132, 134 that are configured to employ a hierarchical structure that serves as a basis to generate the decision data 130 and use of the decision data 130, respectively.

Figure 2:
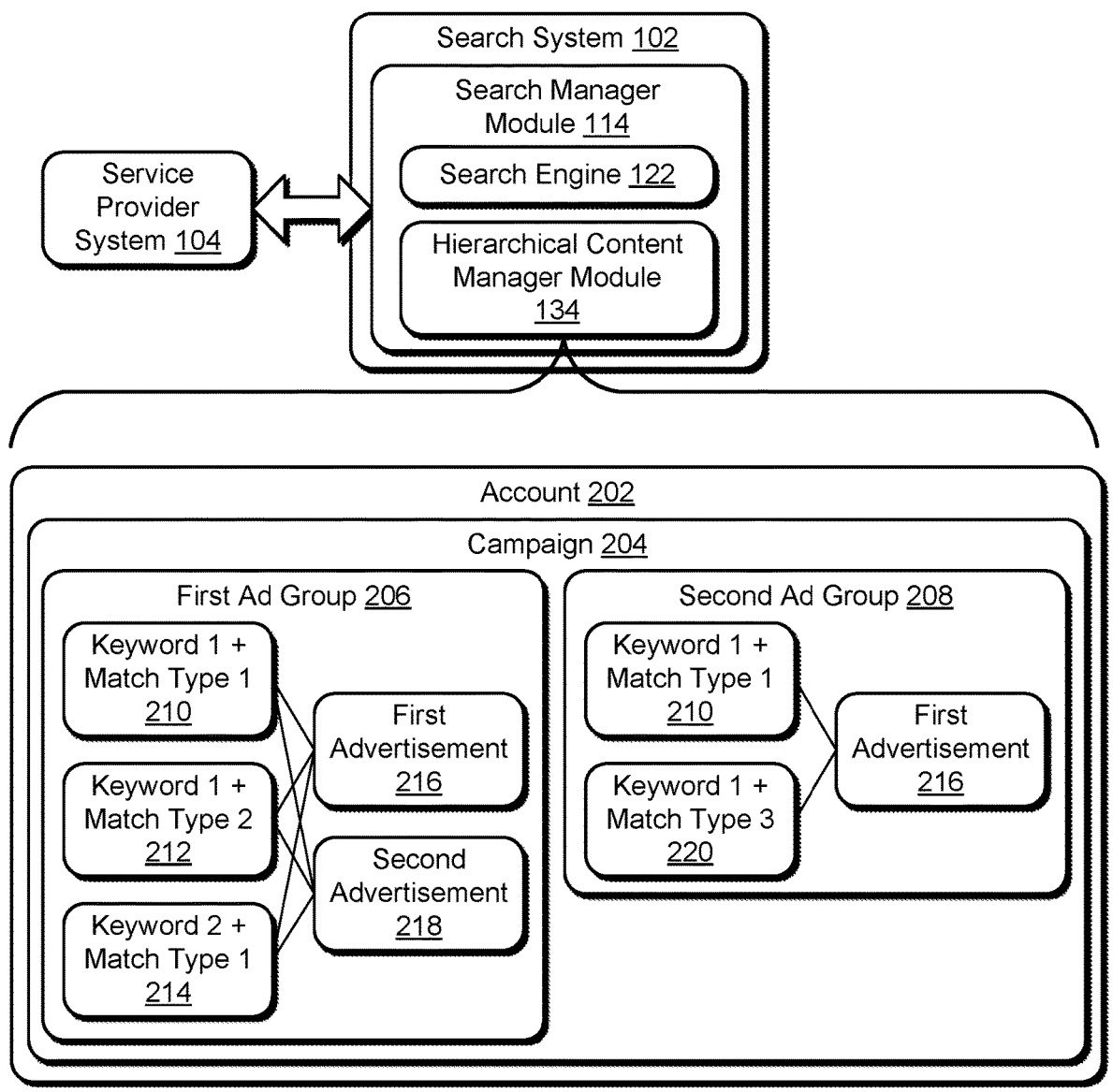
FIG. 2 depicts a hierarchical structure of resource allocation management in a sponsored search scenario through use of a hierarchical content manager module of a search system of FIG. 1.

FIG. 2 depicts a hierarchical structure 200 of resource allocation management in a sponsored search scenario through use of a hierarchical content manager module 134 of the search system 102. In this example, a user of the service provider system 104 (e.g., an advertiser) interacts with the hierarchical content manger module 134 of the search system 102. This functionality may also be implemented in whole or in part locally by the hierarchical content manager module 132 of the service provider system 104 of FIG. 1.

As part of this interaction, inputs are received by the search system 102 to create an account 202 and construct several campaigns 204 within the account 202. Under each campaign 204, inputs are received to group keywords and advertisements (i.e., supplemental digital content 124) in first and second ad groups 206, 208 to be used for control of digital content output, e.g., resource allocation for targeting and management purposes. Advertisements may share keywords in a common ad group. For the first ad group 206, for instance, "Keyword 1+Match Type 1" 210, "Keyword 1+Match Type 2" 212, and "Keyword 2+Match Type 1" 214 are shared by first and second advertisements 216, 218. For the second ad group 208, "Keyword 1+Match Type 1" 210 and "Keyword 1+Match Type 3" 220 are also associated with the first advertisement 216.

For each keyword, a user of the service provider system 104 (i.e., an "advertiser") may set matching types used between keywords and search queries, such as "broad match", "exact match" and "other" match types. The advertisers may also set targeting criteria using geographic and demographic information at ad group or campaign level and set daily revenue budgets at a campaign level.

In order to determine effectiveness in resource allocation, performance metrics are utilized by both the service provider system 104 and the search system 102. The service provider system 104, for instance, may wish to minimize an amount of revenue spent in order to expose supplemental digital content 124 to the client devices 106 that has a greatest likelihood of "success," e.g., resulting in conversion, while minimizing a cost in doing so. On the other hand, the search system 102 may wish to maximize an amount of revenue received from the service provider systems 104. In the following discussion, performance metrics from a viewpoint of a service provider system 104 are discussed that involve "revenue per click" (RPC) prediction. Similar challenges are also faced by other performance metric predictions and thus the following discussion may be generalized to these other performance metrics.

In the following "decision units" (e.g., "bid units") are defined as atomic units at which the service provider system 104 generates decision data 130 to control resource allocation, e.g., set bid amounts. Decision units are different from keywords because the same keywords can be targeted in multiple ad groups or campaigns and set with different bids. For example, as shown in FIG. 2, "Keyword 1+Match Type 1" 210 under the first Ad Group is a decision unit and "Keyword 1+Match Type 1" 210 under the second Ad group 208 is another decision unit.

The task performed by the systems in the following discussion is to predict revenue per click (RPC) for each decision unit. The performance data collected by the service provider system 104 (e.g., as advertisers) includes impressions, clicks, conversions and attributed revenue at a decision unit level. Also in this discussion, RPC predictions are generated on a daily basis, and thus clicks and revenue at a decision unit level are aggregated for each day, with records having zero clicks removed. Thus, an initial set of data (e.g., historical data) is used to generate a hierarchical structure of a statistical model. The hierarchical structure, once generated, then processes a subsequent set of data (e.g., "current" data) in order to control digital content output, e.g., select digital marketing content.

In the following discussion, let "$x_{i,m}$" and "$y_{i,m}$" denote the "m-th" observed number of clicks and attributed revenue for bid unit "i" in historical data. The corresponding RPC is a ratio between "$y_{i,m}$" and "$x_{i,m}$." Given the historical clicks and revenue data $\{x_{i,m}, y_{i,m}; m=1, 2, \ldots, n_i\}$, a prediction is generated for a next time interval's (e.g., a next day) RPC for decision unit "i." The features used to do so by the system are the hierarchical structure information of the decision units of the statistical model, such as corresponding campaigns, ad groups, keywords and so on as well as some upper level variables. Here, upper level variables refer to information above a decision unit level, such as geo targeting at a campaign level which is shared by the decision units under each campaign.

As described above, a challenge in RPC prediction is that at a decision unit level, the data is sparse even though the amount of data available to the system overall is immense. There are two types of sparsity issues, from the perspective of user behaviors. The first one is that for a large number of decision units, in practice in the real world only a small number of days record non-zero clicks. Missing clicks are referred to as "x-sparsity." Another issue in real world implementations is that among all the decision units that are clicked, the majority do not generate revenue to the service provider system 104, e.g., the advertiser. This missed revenue is denoted as "y-sparsity."

To further illustrate this situation, in one real world scenario a month's worth of data is collected in which an average x-sparsity is about 90%, meaning only 10% of the dates collect clicks data. Also, about 70% of the decision units have x-sparsity higher than 90%. For y-sparsity, the average is about 98%, meaning among the dates with clicks data, about 98% of these dates have zero revenue. Also, about 90% of the bid units have y-sparsity higher than 90%. Thus, statistical models built at a decision unit level using conventional techniques by pushing down upper level variables generate low and even zero RPC predictions for a significant portion of the decision units. These sparse predictions are undesirable for several reasons. First, the decision units may still have potential usefulness. Previous records having a zero value, for instance, do not necessarily mean the following day still bears a zero value, and these potentials are fully ignored by sparse predictions in conventional techniques, which leads to an overfitting model. Second, distinguishing between decision units using sparse predictions is not aided as part of allocating limited resources.

As previously described, conventional Hierarchical Bayes techniques require a pre-determined hierarchical structure, a priori using a structure of variables (e.g., features) in the data, which becomes a challenge when user-defined variables are involved. For example, it is not intuitive to judge which variable is to be assigned to a parent or child node in data, such as between variables (i.e., features) "Keyword" and "Geo."

Accordingly, in the techniques described herein a hierarchical structure is determined automatically and without user intervention using information in the data, itself, without outside knowledge (e.g., knowledge of a domain), such that the hierarchical structure can be determined layer by layer. This is performed by the systems in the following through a combination of Empirical Bayesian analysis and tree modeling. Additionally, these techniques may be configured to incorporate uncertainty before combining values from parent or child nodes. In this way, the techniques described herein may expand beyond conventional techniques that allow the child nodes to borrow information from their parents by combining the mean values of parent and child nodes that ignore uncertainty of the mean values.

Figure 3:
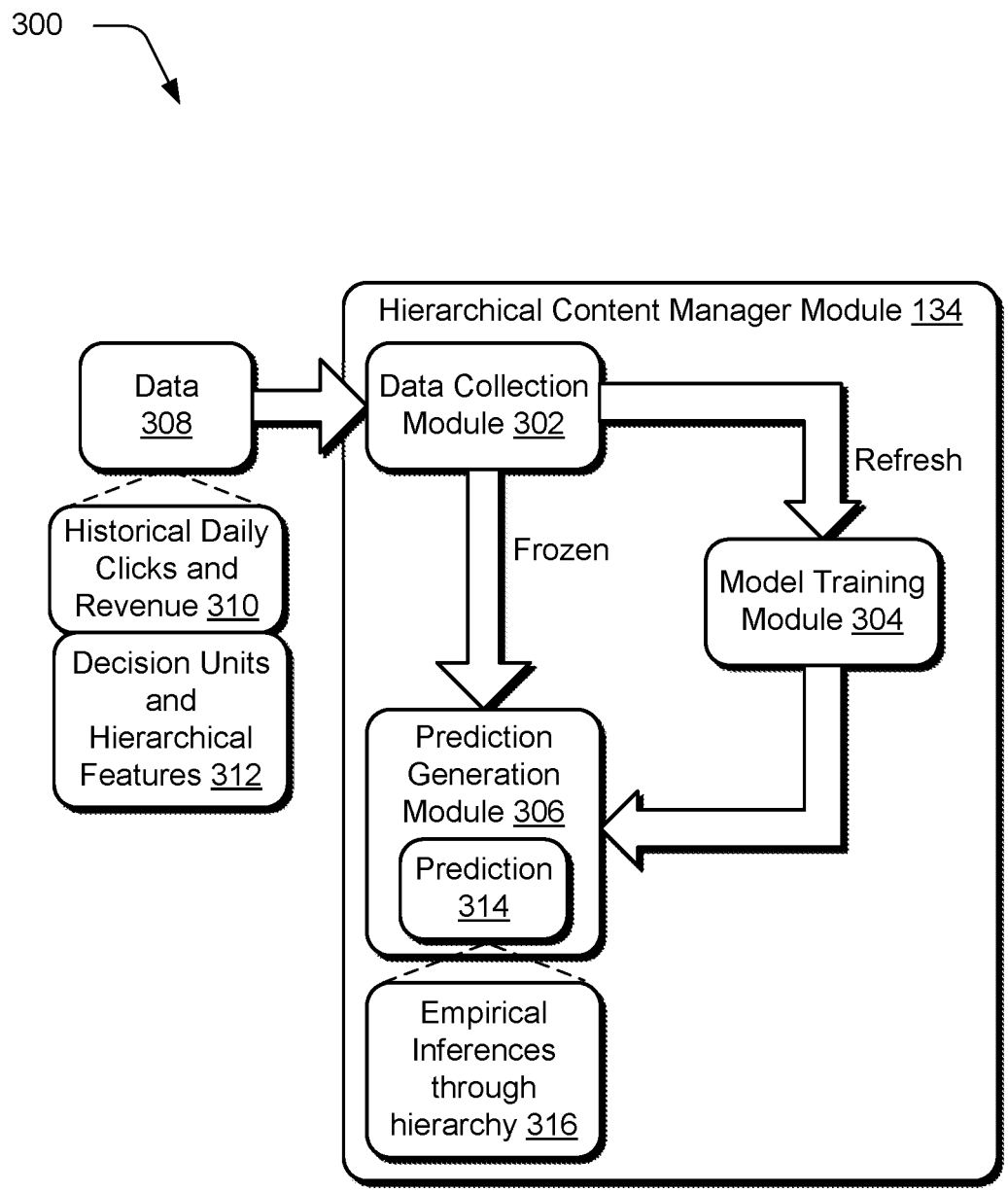
FIG. 3 depicts a system architecture of a hierarchical content manager module of FIG. 1.

FIG. 3 depicts a system architecture 300 of the hierarchical content manager module 134 of FIG. 1. This system architecture 300 is configured to generate and use a statistical model having a hierarchical structure to make predictions. In the illustrated example, the system architecture 300 includes a data collection module 302, a model training module 304, and a prediction generation module 306. The data collection module 302 is representative of functionality to obtain data 308 that is to be used to generate the statistical model (e.g., historical "training" data) and for subsequent use of the statistical model to generate the prediction.

Examples of the data 308 include historical dialing clicks and revenue 310 as well and decision units and corresponding hierarchical features 312.

The model training module 304 is representative of functionality to fit a statistical model to the data 308 through use of the Dynamic Hierarchical Empirical Bayes (DHEB) techniques described herein. The prediction generation module 306 is representative of functionality to generate a prediction based on the statistical model and corresponding hierarchical structure generated by the model training module 304 to process subsequently obtained data.

In an implementation, the model training module 304 is configured to refresh the hierarchical structure of the statistical model at predefined intervals because in practice the hierarchical structure does not exhibit significant amounts of changes over relative short periods, e.g., daily. Thus, instead of refreshing the structure every day, the system is designed to retrain the hierarchical structure of the statistic model based on a parameter T which define a period of hierarchy updating. For example, T=1 may cause the hierarchical structure to be updated daily, T=2 specifies an update every other day, and so on. Between updates, changes to the statistical model are "frozen" and thus newly collected data 308 flows through the hierarchy and used to obtain prediction at each node at a decision unit level. In practice, it has been found that a value of T as equal to four reduces time complexity and supports real time output without sacrificing accuracy.

Figure 4:
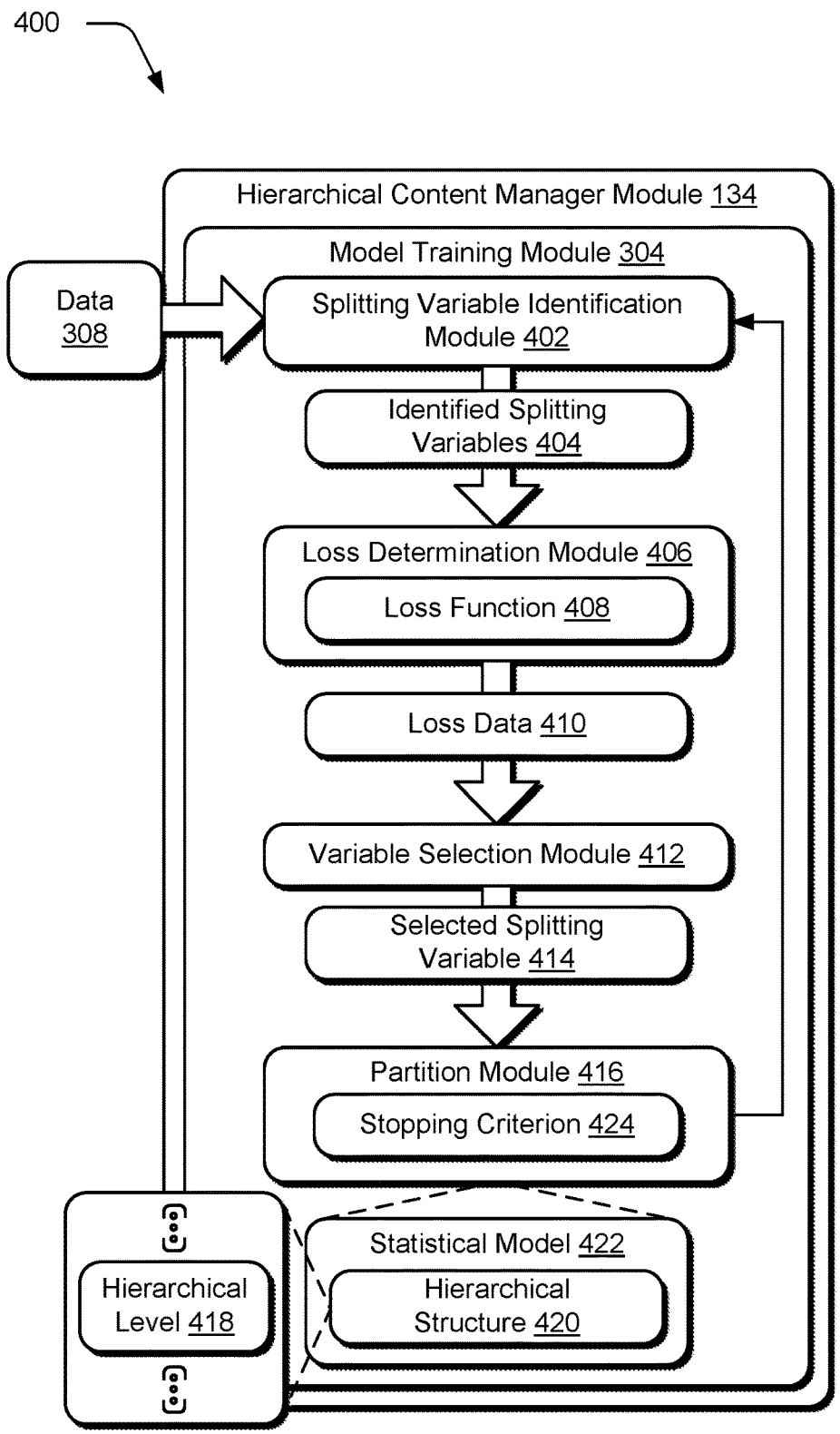
FIG. 4 depicts an example system showing operation of a model training module of FIG. 3 in greater detail.
Figure 5:
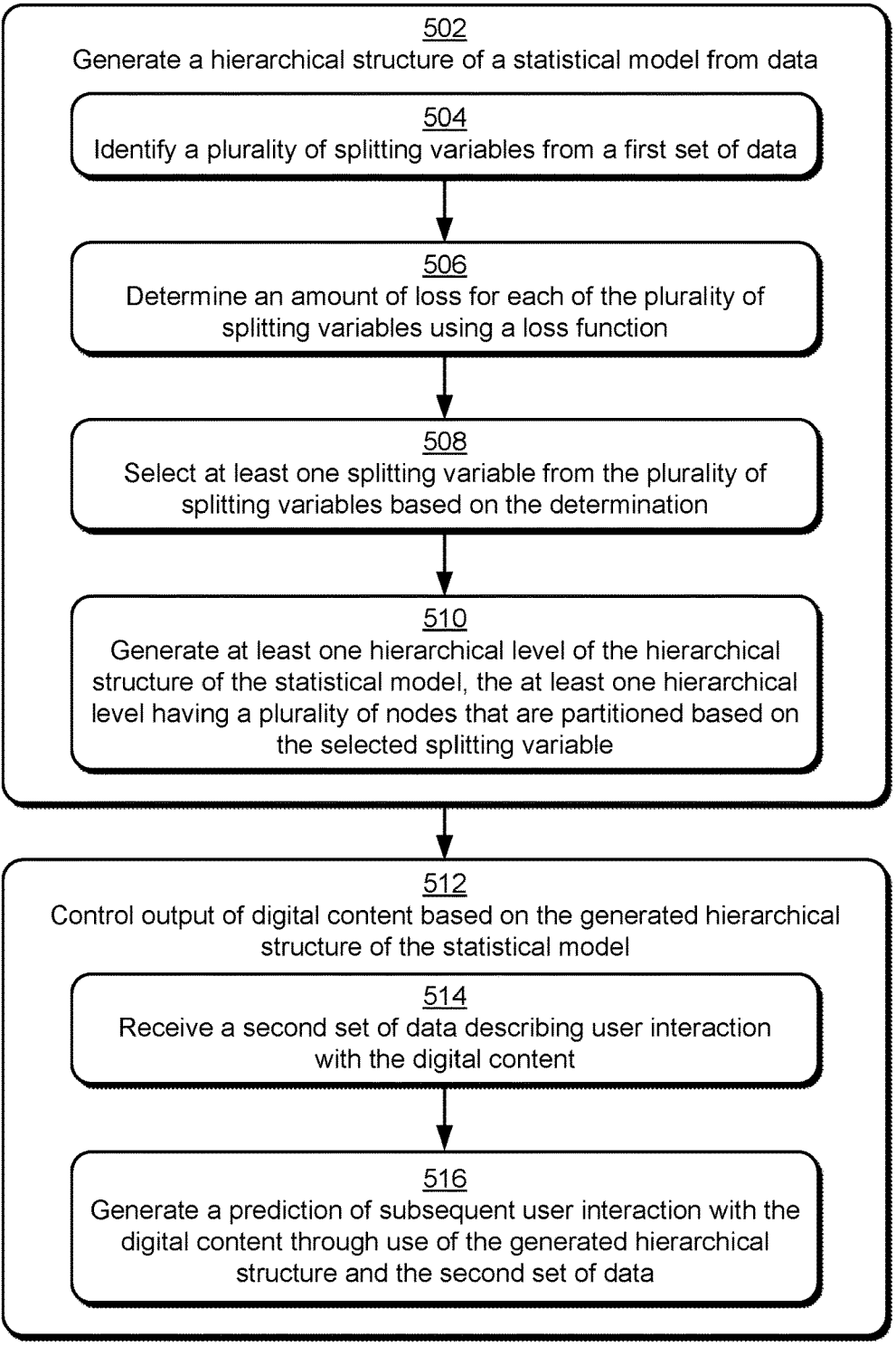
FIG. 5 is a flow diagram depicting a procedure in an example implementation in which a hierarchical structure of a statistical model is generated automatically and without user intervention by a model training module of FIG. 4 and used to generate predictions to control output of digital content.

FIG. 4 depicts an example system 400 showing operation of the model training module 304 of FIG. 3 in greater detail. FIG. 5 depicts an example procedure 500 in which a hierarchical structure of a statistical model is generated automatically and without user intervention by the model training module 304 of FIG. 4 and used to generate predictions to control output of digital content.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference is made interchangeably to FIGS. 4 and 5.

Figure 6:
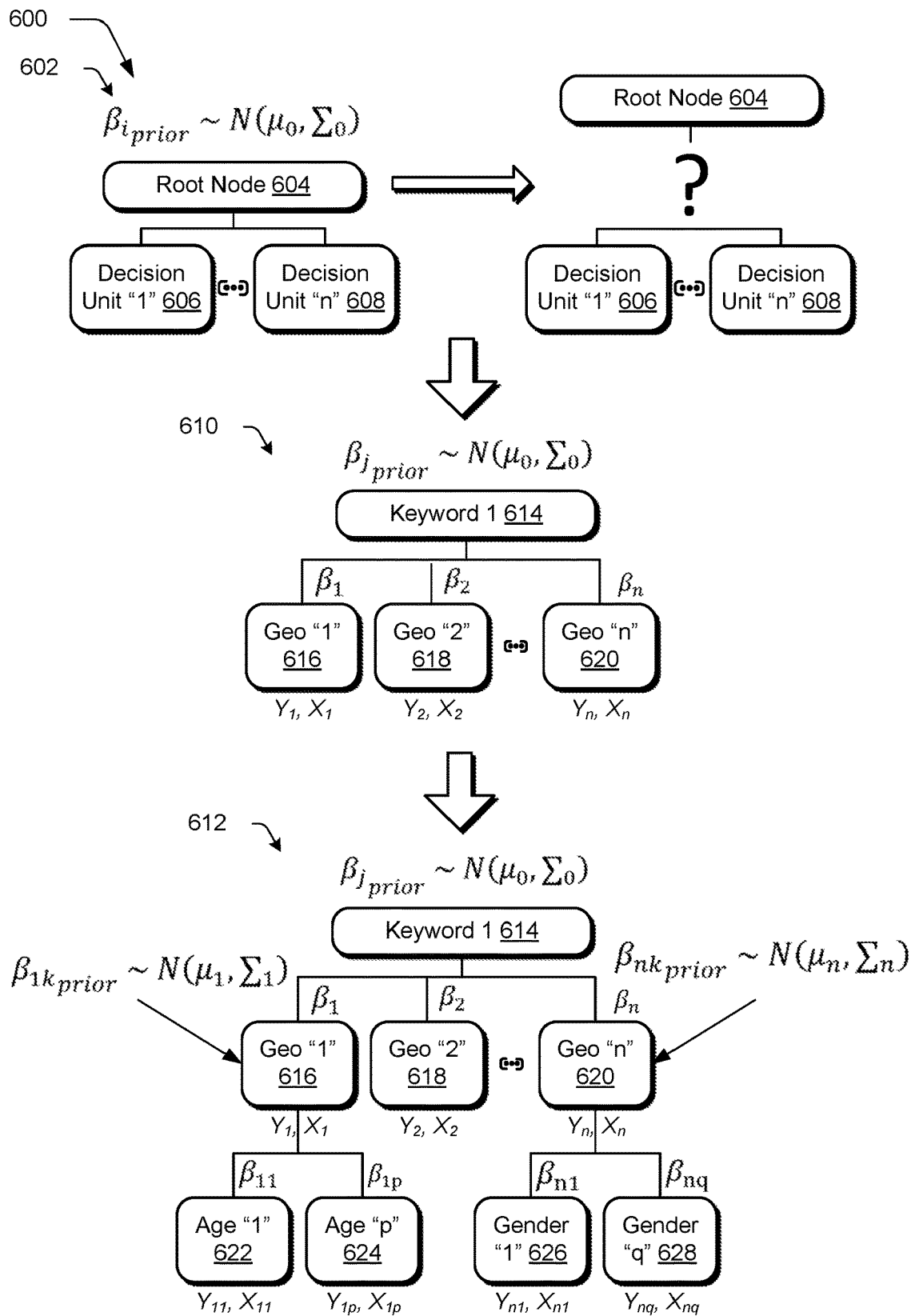
FIG. 6 depicts an example of generation of a hierarchical structure of a statistical model.

To begin in this example, data 308 is received by the model training module 304 from the data collection module of FIG. 3, e.g., "historical data." From this data 308, the model training module 304 generates a hierarchical structure of a statistical model from the data 308 (block 502), e.g., a Hierarchical Bayes statistical model. The model training module 304, for instance, first employs a splitting variable identification module 402 to identify a plurality of splitting variables 404 from the data 308 (block 504). The splitting variable identification module 402, for instance, may determine which variables are included in the data 308. A wide variety of variables may be included in the data 308, such as demographic data that describes a user, data that describes characteristics of digital content, historical daily click and revenue 310 data, data that describes decision units and hierarchical features 312, user defined variables, and so forth. The data 308, for instance, may include splitting variables such as geographical location, keywords, age, gender, and so forth, an example of which is shown in FIG. 6.

The identified splitting variables 404 are then passed to a loss determination module 406 to determine an amount of loss for each of the plurality of splitting variables using a loss function 408 (block 506) to generate loss data 410. A loss function is a function that maps an event or values of the splitting variables onto a result number as representing a "cost" associated with the event, e.g., in relation to one or more performance metrics. One such performance metric is "revenue per click" (RPC) as further described in the Implementation Example section below, which is calculated for each of the identified splitting variables.

A variable selection module 412 is then employed to select at least one splitting variable from the plurality of splitting variables based on the determination (block 508). The variable selection module 412 selects the splitting variable that minimizes the cost (i.e., has the lowest amount of cost) from the loss data 410. Continuing with the previous example, the "historical" data 308 may include splitting variables such as geographical location, keywords, age, gender, and so forth. An amount of loss is then calculated for each of the splitting variables by the loss determination module 406 using a loss function 408 in relation to performance metric, such as revenue per click (RPC). The variable selection module 412 then selects the splitting variable that minimizes the loss, i.e., the cost as defined in relation to the performance metric.

Based on the selected splitting variable 414, a partition module 416 is employed to generate at least one hierarchical level 418 of the hierarchical structure 420 of the statistical model 422. The hierarchical level 418 includes a plurality of nodes that are portioned based on the selected splitting variable (block 510). For example, a root node in the hierarchical structure 420 contains an entirety of a population of decision units, i.e., the whole population with all decision units. If a splitting variable "Geo" is used as a first splitting variable, for instance, and there are n unique geographical locations identified in the data, then the root node is split to n child nodes with each child node containing the decision units that share the same geographic location.

For decision units in each child node, a same RPC is estimated for each of the child nodes. Additionally, child nodes under a common parent node share a same prior distribution and thus the term "parent information" is used to represent the "prior information." Accordingly, the model training module 304 is configured to generate the hierarchical levels 418 over a number of iterations to form the hierarchical structure 420. A stopping criterion 424 is used to determine "when to stop" generation of the hierarchical levels 418. To do so, the partition module 416 may employ a variety of stopping criteria, such as when the number of instances in a node is less than a pre-specified limit, the depth of a node (e.g., number of hierarchical levels) is greater than a pre-specified limit, and so on.

Output of digital content is then controlled based on the generated hierarchical structure of the statistical model (block 512). To do so, a second set of data (e.g., "current" data) is received that describes user interaction with the digital content (block 514), e.g., from the data collection module 302. A prediction is then generated by the prediction generation module 306 of subsequent user interaction with the digital content through use of the generated hierarchical structure and the second set of data (block 516). The prediction, for instance, may estimate an amount of "revenue per click" at each decision unit in the hierarchical structure, which is then used to rank and select supplemental digital content 124. In this way, the hierarchical structure may be determined automatically and without user intervention to control digital content output, a further example of which is described in the following section.

Implementation Example

In this section, a two-level Bayesian regression model is first described that is configured for use in RPC prediction. A Hierarchical Shrinkage Loss (HSL) function is then described for use in determining a hierarchical structure of a statistical model empirically, which is then followed by a discussion of a Dynamic Hierarchical Empirical Bayes technique.

Two-Level Hierarchical Bayesian Regression

For each decision unit i, its RPC $\beta_i$ is a random variable and supports construction of a linear regression model from historical data as follows:

$$Y_i = \beta_i X_i + \epsilon_i,$$

where $X_i = (x_{i,1}, x_{i,2}, \ldots, x_{i,n_i})^T$ and $Y_i = (y_{i,1}, y_{i,2}, \ldots, y_{i,n_i})^T$ are historical number of clicks and revenue, and $\epsilon_i \sim N(0, \sigma_{\epsilon_i}^2)$. The techniques described herein are configured to determine an inference about $\beta_i$ for each decision unit, i.e., "bid" unit. In a Bayesian approach, this assumes a prior distribution of parameter $\beta_i$, which is then combined with a prior belief of the data's likelihood function to yield a posterior belief. Assume, for instance, $\beta_i$ has a normal prior distribution as follows:

$$\beta_{i_{prior}} \sim N(\mu_0, \sigma_0^2),$$

where $\mu_0$, $\sigma_0$ are pre-specified hyper-parameters. Then, given a likelihood $Y_i | \beta_i, X_i, \sigma_{\epsilon_i}^2 \sim N(\beta_i X_i, \sigma_{\epsilon_i}^2 I_{n_i})$, where $I_{n_i}$ is an $n_i \times n_i$ identical matrix, the posterior for $\beta_i$ is $$\beta_{i_{post}} | Y_i, X_i, \sigma_{\epsilon_i}^2 \propto P(Y_i|\beta_i, X_i, \sigma_{\epsilon_i}^2) P(\beta_{i_{prior}}) \sim N(\mu_i, \sigma_i^2),$$

$$\mu_i = \frac{\frac{1}{\sigma_0^2}\mu_0 + \frac{1}{\sigma_{\epsilon_i}^2} X_i^T X_i (X_i^T X_i)^{-1} X_i^T Y_i}{\frac{1}{\sigma_0^2} + \frac{1}{\sigma_{\epsilon_i}^2} X_i^T X_i}$$

$$\frac{1}{\sigma_i^2} = \frac{1}{\sigma_0^2} + \frac{1}{\sigma_{\epsilon_i}^2} X_i^T X_i$$

Application of the same prior distribution for all $\beta_i$s and use of a posterior mean as the predicted RPC for each bid unit results in non-sparse predictions due to borrowing of information by incorporating a prior distribution. This prior information is obtained by empirical Bayes which incorporates the information in the "big data."

In one example, a multi-level hierarchical Bayesian technique is used to propagate information across the hierarchical structure and allow information to be shared among sub groups of nodes that are nearby to each other in the hierarchical structure. Decision units, for instance, in the same ad groups may perform in a similar manner and thus may share a same prior distribution. In the following, a bottom hierarchical level of the hierarchical structure is set at a decision unit level in order to differentiate between different decision units.

Accordingly, the system is now tasked with determining appropriate intermediate hierarchical levels as shown at a first stage 602 of an example implementation 600 of FIG. 6. At the first stage 602, the techniques described herein are used to determine a hierarchical structure including one or more intermediate hierarchical layers between a root node 604 and decision unit nodes 606, 608. To do so, the system employs a Dynamic Hierarchical Empirical Bayes technique over one or more iterations, examples of which are illustrated as second and third stages 610, 612 which are further described below.

In a conventional Hierarchical Bayesian (HB) technique, the hierarchical structure is pre-determined by domain knowledge. However, in practice in real world scenarios this information may not be readily available or accurate as described above, thereby leading to erroneous results and computational inefficiency. For example, although a hierarchical structure may be available for bid management as described in relation to FIG. 2, there are still some issues when trying to set the hierarchy.

In one such instance, features may not exhibit a natural hierarchy. For example, under each ad group, advertisers may set multiple keywords to target, which indicates that a hierarchy may be created with "Keyword" under "Ad Group." However, a common keyword may also appear in different ad groups targeting different types of customers. In such an instance, it may also be reasonable to put "Ad Group" under "Keyword" as well. Because the hierarchical structure is the foundation in HB techniques, accuracy of the hierarchical structure is critical to accuracy of the techniques as a whole. This is especially true when data at an individual decision unit level is sparse and thus information borrowing is to be employed through the HB structure.

Hierarchical Shrinkage Loss

Based on the above discussion, a data-driven approach is employed by the techniques described herein to determine a hierarchical structure through use of splitting variables. This technique is similar to tree splitting in tree models, in which, the hierarchical structure is determined based on a pre-defined loss. In an implementation, each split is fully partitioned utilizing a correspond splitting variable. In the interest of visualization and brevity, the terminology of "node" is borrowed from tree models.

The root node in the hierarchical structure contains an entirety of a population of decision units, i.e., the whole population with all decision units. If "Keyword" is used as a first splitting variable, for instance, and there are n unique keywords in the data, then the root node is split to n child nodes with each child node containing the decision units that share the same keyword. For decision units in each child node, a same RPC is estimated for each of the child nodes. Additionally, child nodes under a common parent node share a same prior distribution thus the term "parent information" is used to represent the "prior information" in the following discussion.

Based on the observation of posterior mean (1) which is a weighted average of parent information and information of itself, a Hierarchical Shrinkage Loss (HSL) may be defined as follows:

$$L_p(l, \beta) = \Sigma_{k=1}^{n_l} h(\alpha_{p_{lk}} f(\beta_{p_{lk}}, X_{p_{lk}}, Y_{p_{lk}}) + \gamma_{p_{lk}} g(\beta_{p_{lk}}, \beta_p)),$$

where p denotes the parent node; $p_l = \{p_{l1}, p_{l2}, \ldots, p_{ln_l}\}$ denotes the child nodes of p when splitting by feature l; $\beta_{p_{lk}}$ and $\beta_p$ represent the RPC predictions in child node $p_{lk}$ and parent node p respectively; $X_{p_{lk}}$ and $Y_{p_{lk}}$ are the data in child node $p_{lk}$; f and g are functions measure the within-node loss and loss to the parent node, and $\alpha_{p_{lk}}$ and $y_{p_{lk}}$ represent the importance of the two losses; h(x) is a scalar function which transforms x to the order of interest.

The hierarchical shrinkage loss includes two terms. The first term measures a weighted information loss within each child node. The second term takes into account a discrepancy between estimators of the child node and the parent node. An estimator for each child node is used to consider not only the data within the child node, itself, but also the information from a respective parent node, which also inherits from its parent node according to the hierarchical structure. This additional hierarchical information improves stability of the model.

Dynamic Hierarchical Empirical Bayes (DHEB)

In this section, a Dynamic Hierarchical Empirical Bayes technique is used to generate a hierarchical structure using a hierarchical shrinkage loss as described in the previous section. In a multi-level hierarchical Bayesian technique, parameters of child nodes under a same parent node are taken from a common prior distribution and the prior information flows through the hierarchical structure. In a full Bayesian analysis, a complete joint posterior distribution is generated according to the pre-determined hierarchy, and simulations are usually applied to generate inferences. In the DHEB technique described herein, the hierarchical structure is generated dynamically from top to bottom. Thus, instead of a full Bayesian analysis, a stepwise (i.e., iterative) approach is employed that leverages empirical Bayes. These techniques are usable to not only generate the hierarchical structure, but also present an efficient way to obtain inferences. Thus, the hierarchical structure may be used to obtain inferences without simulation, thereby improving computational efficiency over conventional techniques that require use of simulation to obtain these inferences.

Return will now be made to the example implementation 600 of FIG. 6. As previously described, the systems described herein are tasked with determining appropriate intermediate hierarchical levels as shown at a first stage 602 of an example implementation 600 of FIG. 6. In the first stage 602, the techniques described herein are used to determine a hierarchical structure including one or more intermediate hierarchical layers between a root node 604 and decision unit nodes 606, 608. To do so, the system employs a Dynamic Hierarchical Empirical Bayes technique over one or more iterations, examples of which are illustrated as second and third stages 610, 612 through use of a loss function.

At the second stage 610, for instance, a node "Keyword 1" 614 is included in a hierarchical structure. The system then first identifies splitting variables usable to split the node, and from this, selects the splitting variable that exhibits a lowest amount of loss (i.e., minimizes the loss) based on a loss function. In the illustrated example, assume "Geo" is used as the splitting variable to split data for each "Geo" as child nodes 616, 618, 620. Accordingly, each of the "Geo" nodes 616, 618, 620 include data $X_j$ and $Y_j$.

$$Y_j = \beta_j X_j + \epsilon_j,$$

$$j=1, \ldots, n, \epsilon_j \sim N(0, \sigma_{\epsilon_j}^2),$$

where $X_j = (x_{j,1}, x_{j,2}, \ldots, x_{j,n_j})^T$ and $Y_j = (y_{j,1}, y_{j,2}, \ldots, y_{j,n_j})^T$ are observed number of clicks and revenue at node j, which contains $n_j$ observations.

An assumption is made for each of the $\beta_j$s across different "Geo"s are related and generated from a common prior distribution because these nodes share the same parent nodes, which is $\beta_{j_{prior}} \sim N\{\mu_0, \sigma_0^2\}$. Based on the previous prior discussion, a posterior distribution of $\beta_j$ is obtained for each "Geo" node 616, 618, 620 as follows:

$$\beta_{j_{post}} \mid Y_j, X_j, \sigma_{\epsilon_j}^2 \sim N(\mu_j, \sigma_j^2)$$

-continued $$\mu_j = \frac{\frac{1}{\sigma_0^2}\mu_0 + \frac{1}{\sigma_{\epsilon_j}^2} X_j^T X_j (X_j^T X_j)^{-1} X_j^T Y_j}{\frac{1}{\sigma_0^2} + \frac{1}{\sigma_{\epsilon_j}^2} X_j^T X_j}$$

$$\frac{1}{\sigma_j^2} = \frac{1}{\sigma_0^2} + \frac{1}{\sigma_{\epsilon_j}^2} X_j^t X_j.$$

Using the posterior mean $\mu_j$ as an estimate for $\beta_j$ in each child node, a loss function is constructed for a current partition as follows:

$$L_p(l, \beta) = \tag{6}$$

$$\sum_{j=1}^{n} n_j \left( \frac{1}{(X_j^T X_j)^{-1} \sigma_{\epsilon_j}^2} (\beta_j - (X_j^T X_j)^{-1} X_j^T Y_j)^2 + \frac{1}{\sigma_0^2} (\beta_j - \mu_0)^2 \right) =$$

$$\sum_{j=1}^{n} n_j (\alpha_j f(\beta_j, X_j, Y_j) + \gamma_j g(\beta_j, \mu_0)),$$

where $f(\beta_{P_{lk}}, X_{P_{lk}}, Y_{P_{lk}}) = f(\beta_j, X_j, Y_j) = (\beta_j - (X_j^T X_j)^{-1} X_j^T Y_j)^2$, $g(\beta_{P_{lk}}, \beta_P) = g(\beta_j, \mu_0) = (\beta_j - \mu_0)^2$, $\alpha_{P_{lk}} = \alpha_j = \frac{1}{(X_j^T X_j)^{-1} \sigma_{\epsilon_j}^2}$, $\gamma_{P_{lk}} = \gamma_j = \frac{1}{\sigma_0^2}$, $h(x)=nx$, with node $p_{lk}$ denoted as j for short.

The optimal solution of $\hat{\beta}_j$ is $\mu_j$. Function $f$ represents a difference between the parameters of the child nodes and ordinary least squares (OLS) estimations based on the sample data. Function g measures a difference between the parameters of the child nodes and parent node which is represented by a prior mean. The weights of the two losses are used by the system to determine how much the corresponding information is trusted. The variables $\alpha_j$ and $\gamma_j$ are inversely proportional to the variance of the OLS estimator and prior variance.

Therefore, if the prior variance is larger, it provides noisier information regarding the $\beta_j$ estimates, and hence its contribution is smaller than the case when the prior variance is smaller. Similarly, if the sample data is divergent and noisy, it is assigned less weight. Also, for the expression $h(x)=nx$, where n is the number of observations in the node, the loss is multiplied for each child node by the number of observations in the node. The causes the loss to be shrunk to one node level by f and g. In order to make the losses for different splitting features comparable, the loss is calculated at an individual observation level and treated at a node level as a representation for each of the observations in this node.

Once the loss function is calculated, a determination is made as to which splitting variables (i.e., features) are to be used for a partition as follows:

$$l^* = \arg\min_{l} L_p(l, \hat{\beta}).$$

Returning again to FIG. 6, assume "Geo" is used as a splitting variable for the second stage 610, another splitting variable is then identified and used at the third stage 612.

Again, assume the posterior distribution of $\beta_j$ as the prior distribution of $\beta_{jk}$ under "Geo j." The same technique is applied recursively (i.e., iteratively), which is $\beta_{jk_{prior}} \sim \beta_{j_{post}}$.

For each child node, different splitting variables are identified and selected by the system to form further partitions as child nodes 622, 624, 626, 628. Thus, as the system progresses, the best splitting variables are identified as selected based on the following:

$$\{l_j^*:l_j^* = \arg\min_l L_j(l, \hat{\beta}); j \in p\}.$$

To calculate an amount of loss, both prior distribution of $\beta_j$ and regression variance $\sigma_{\epsilon_j}^2$ are assumed known, therefore, sample data is used to generate estimations. For a prior distribution, the parameters in root node are used, solely, since the posterior of parent node is used as prior for its child nodes. Empirical Bayes is applied when there is a lack of prior knowledge. In the following example, a sample mean is used as the prior mean and weighted sample variance as the prior variance:

$$\mu_0 = \frac{\Sigma_m y_m}{\Sigma_m x_m}$$

$$\sigma_0^2 = \frac{\Sigma_m x_m \left(\frac{y_m}{x_m} - \mu_0\right)^2}{\Sigma_m x_m - 1},$$

where m denotes total historical data for all bid units. The variance $\sigma_{\epsilon_j}^2$ is estimated for each node 622, 624, 626, 628 by:

$$\hat{\beta}_{j,OLS} = (X_j^T X_j)^{-1} X_j^T Y_j$$

$$\sigma_{\epsilon_j}^2 = \frac{1}{n_j - 1}(Y_j - \hat{\beta}_{j,OLS} X_j)^T (Y_j - \hat{\beta}_{j,OLS} X_j),$$

where $\hat{\beta}_{j,OLS}$ is the OLS estimator and $n_j$ is the number of observations for node j.

In order to determine when to stop the iterations and thus partitioning of the hierarchical structure, the system may employ a variety of stopping criteria. Similar to tree models, many stopping criteria can be applied, such as when the number of instances in a node is less than a pre-specified limit, the depth of a node is greater than some pre-specified limit, and so on. In one such example, a stopping criterion is defined as follows:

$$\frac{SSE(p_{l^*})}{SSE(p)} > r,$$

where $SSE(p) = \|Y_p - \hat{\beta}_p X_p\|^2$ and $SSE(p_{l^*}) = \Sigma_{j \in p_{l^*}} \|Y_j - \hat{\beta}_j X_j\|^2$, which denote the sum of squared errors for parent node p and child nodes $p_{l^*}$. In other words, a node will stop growing when the total sum of squared errors does not decrease by a certain ratio 1-r.

The system is then configured to attach a decision unit hierarchical level to a bottom of the hierarchical structure. This is performed by looping the leaf nodes of the hierarchy and subdividing them into child nodes, in which, each node contains the data for a specific decision unit. FIG. 7 depicts an example implementation 700 of a Dynamic Hierarchical Empirical Bayes technique.

In the above discussion, a Dynamic Hierarchical Empirical Bayesian (DHEB) technique is utilized to build a multi-level hierarchical statistical model automatically and without user intervention to address the challenges faced in resource allocation, e.g., in RPC prediction in online advertising. The techniques provide a way to choose hierarchical levels by incorporating a loss function as in tree models. In addition, these techniques employ an empirical Bayesian approach to generate inferences through a hierarchy. These techniques are applicable to many practical real world problems where data are sparse and hierarchical structure can be leveraged to obtain shrinkage-based estimations. In addition, a regularized loss function may be applied to borrow information from parent node in order to deal with data sparseness.

Example System and Device

Figure 8:
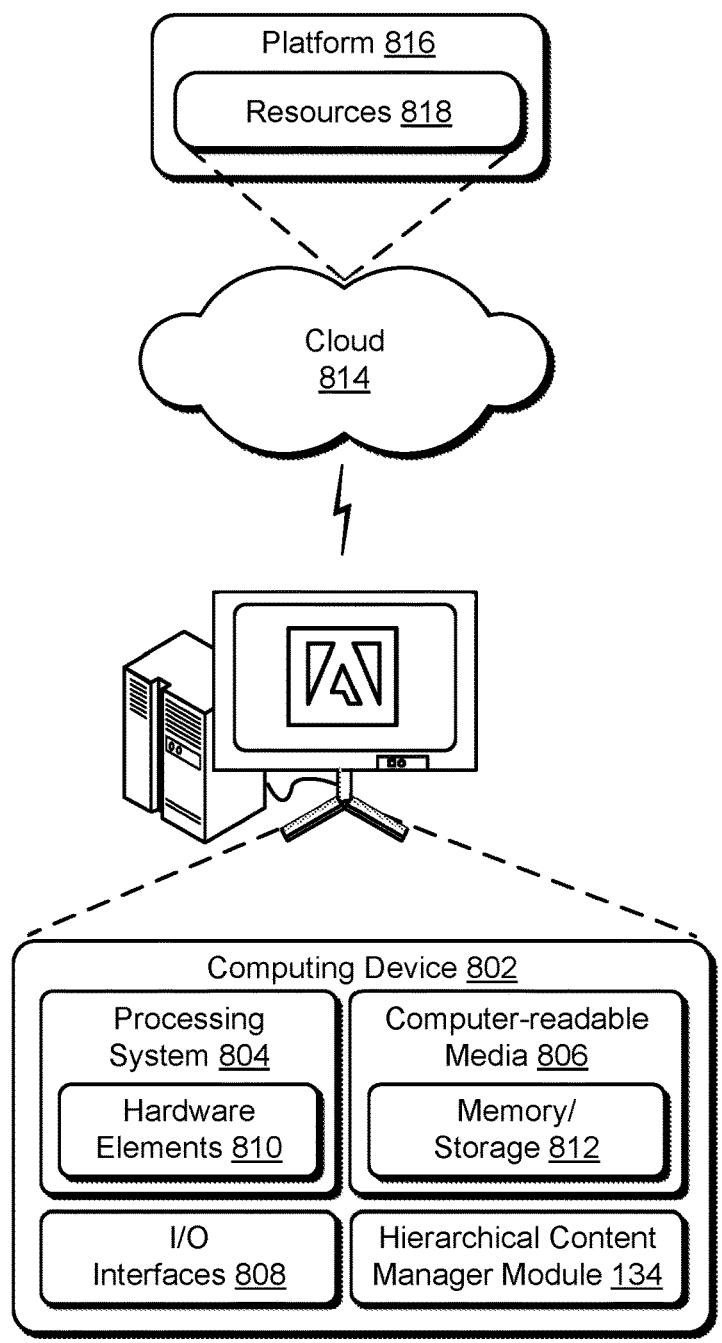
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the hierarchical content manager module 134. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment configured to control output of digital content, a method implemented by at least one computing device, the method comprising:
   collecting, by the at least one computing device, a first set of historical data that describes user interaction with digital content;
   generating, by the at least one computing device, a hierarchical structure of a statistical model from the first set of historical data, the generating including:
      identifying a plurality of splitting variables from the first set of data;
      determining an amount of loss for each of the plurality of splitting variables using a hierarchical shrinkage loss function that includes a first term that measures weighted information loss within a respective child node within the hierarchical structure and a second term that incorporates data within the respective child node and a respective parent node within the hierarchical structure;
      selecting at least one splitting variable from the plurality of splitting variables based on the determining; and
      generating at least one hierarchical level of the hierarchical structure having a plurality of nodes that are partitioned based on the selected splitting variable;
   collecting, by the at least one computing device, a second set of data that describes user interaction with digital content, the second set of data collected subsequent to the first set of historical data;
   generating, by the at least one computing device, a prediction based on a performance metric by applying the generated statistical model to the second set of data; and
   controlling, by the at least one computing device, digital content output based on the prediction.

2. The method as described in claim 1, wherein the selecting is based on which of the plurality of splitting variables exhibits a minimum amount of loss based on the determining.

3. The method as described in claim 1, wherein the controlling includes generating a prediction of subsequent user interaction with the digital content through use of the generated hierarchical structure and the received second set of data, the prediction is used to control which item of digital content of a plurality of digital content is to be output.

4. The method as described in claim 3, wherein the second set of data describes user interaction with the digital content over a pervious timeframe and the prediction is generated for a subsequent timeframe.

5. The method as described in claim 1, wherein the statistical model is a Hierarchical Bayes statistical model including a hierarchical structure having parent and child nodes.

6. The method as described in claim 1, wherein the at least one hierarchical level is an intermediate hierarchical level between a root node and a decision unit hierarchical level.

7. The method as described in claim 1, wherein the hierarchical shrinkage loss function includes a regularization term that incorporates a prior distribution from the respective parent node in the hierarchical structure.

8. The method as described in claim 1, wherein the controlling includes controlling computational resources of the at least one computing device as part of controlling the digital content output.

9. In a digital medium environment, a system comprising:
   a data collection module implemented at least partially in hardware of a computing device to collect a first set of historical data describing user interaction with advertisements and a second set of data collected subsequent to the first set of historical data, the second set of data describing user interaction with advertisements;
   a model training module implemented at least partially in hardware of the computing device to generate a hierarchical structure of a statistical model from the first set of historical data, the model training module including:
      a splitting variable identification module to identify a plurality of splitting variables from the first set of historical data;
      a loss determination module to determine an amount of loss for each of the plurality of splitting variables using a hierarchical shrinkage loss function that includes a first term that measures weighted information loss within a respective child node within the hierarchical structure and a second term that incorporates data within the respective child node and a respective parent node in the hierarchical structure;
      a variable selection module to select at least one splitting variable from the plurality of splitting variables based on the determined amount of loss; and
      a partition module to generate at least one hierarchical level of the hierarchical structure having a plurality of nodes that are partitioned based on the selected splitting variable; and
   a prediction generation module to control advertisement output based on the statistical model as applied to the second set of data.

10. The system as described in claim 9, wherein the variable selection module is configured to select the at least one splitting variable based on which of the plurality of splitting variables exhibits a minimum amount of loss based on the determining.

11. The system as described in claim 9, wherein the prediction generation module is configured to control advertisement output by:
   receiving the second set of data as describing user interaction with the advertisements; and
   generating a prediction of subsequent user interaction with the advertisements through use of the generated hierarchical structure and the received second set of data, and wherein the prediction is used to control which advertisement of the a plurality of advertisements is to be output.

12. The system as described in claim 11, wherein the second set of data describes user interaction with the advertisements over a pervious timeframe and the prediction is generated for a subsequent timeframe.

13. The system as described in claim 9, wherein the statistical model is a Hierarchical Bayes statistical model.

14. The system as described in claim 9, wherein the at least one hierarchical level is an intermediate hierarchical level between a root node and a decision unit hierarchical level.

15. The system as described in claim 9, wherein the hierarchical shrinkage loss function includes a regularization term that incorporates a prior distribution from the respective parent node in the hierarchical structure.

16. The system as described in claim 9, wherein the hierarchical shrinkage loss function measures within-node loss regarding the respective child node and loss between the respective child node and the respective parent node.

17. The system as described in claim 9, wherein the prediction generation module is configured to control computational resources as part of controlling the advertisement output.

18. In a digital medium environment, a system comprising:
> means for collecting first and second sets of data;
> means for generating a hierarchical structure of a hierarchical Bayes statistical model from the first set of data, the generating means including:
>> means for identifying a plurality of splitting variables from the data;
>> means for determining an amount of loss for each of the plurality of splitting variables using a hierarchical shrinkage loss function that includes a first term that measures weighted information loss within a respective child node within the hierarchical structure and a second term that incorporates data within the respective child node and a respective parent node within the hierarchical structure;
>> means for selecting at least one splitting variable from the plurality of splitting variables based on the determining; and
>> means for generating at least one hierarchical level of the hierarchical structure having a plurality of nodes that are partitioned based on the selected splitting variable; and
> means for controlling output of a recommendation based on the hierarchical Bayes statistical model as applied to the second set of data.

19. The system as described in claim 18, wherein the hierarchical shrinkage loss function includes a regularization term that incorporates a prior distribution from the respective parent node in the hierarchical structure.

20. The system as described in claim 18, wherein the hierarchical shrinkage loss function measures within-node loss regarding the respective child node and loss between the respective child node and the respective parent node.

* * * * *